US010883566B2

(12) United States Patent
Gerty et al.

(10) Patent No.: US 10,883,566 B2
(45) Date of Patent: Jan. 5, 2021

(54) SYSTEMS AND METHODS FOR REDUCING NOISE, VIBRATION AND/OR HARSHNESS ASSOCIATED WITH CYLINDER DEACTIVATION IN INTERNAL COMBUSTION ENGINES

(71) Applicant: PACCAR Inc., Bellevue, WA (US)

(72) Inventors: Michael D. Gerty, Bellingham, WA (US); Uday Vadlamani, Burlington, WA (US); Kimberly D. McKinnon, Anacortes, WA (US)

(73) Assignee: PACCAR INC, Bellevue, WA (US)

( * ) Notice: Subject to any disclaimer, the term of this patent is extended or adjusted under 35 U.S.C. 154(b) by 0 days.

(21) Appl. No.: 15/975,616

(22) Filed: May 9, 2018

(65) Prior Publication Data
US 2019/0346012 A1  Nov. 14, 2019

(51) Int. Cl.
*F16F 15/26* (2006.01)
*F02B 75/06* (2006.01)
*F02B 67/08* (2006.01)
*F02D 17/02* (2006.01)
*F02D 41/00* (2006.01)

(52) U.S. Cl.
CPC ............ *F16F 15/264* (2013.01); *F02B 67/08* (2013.01); *F02B 75/06* (2013.01); *F02D 17/02* (2013.01); *F02D 41/0087* (2013.01); *F02D 2250/18* (2013.01); *F02D 2250/28* (2013.01)

(58) Field of Classification Search
CPC ......... F16F 15/26; F16F 15/264; F02B 67/08; F02B 75/06; F02D 17/02; F02D 41/0087; F02D 2250/18; F02D 2250/28
See application file for complete search history.

(56) References Cited

U.S. PATENT DOCUMENTS

| 4,615,227 A | 10/1986 | Stockton |
| 4,706,522 A * | 11/1987 | Nitz ................... F16H 59/141 477/154 |
| 6,434,453 B1 | 8/2002 | Kuroda et al. |

(Continued)

FOREIGN PATENT DOCUMENTS

| DE | 10 2009 006 664 A1 | 9/2010 |
| DE | 102011077656 | 12/2012 |

(Continued)

OTHER PUBLICATIONS

Extended European Search Report dated May 25, 2018, issued in European Application No. 17199329.8, filed Oct. 31, 2017, 7 pages.

(Continued)

*Primary Examiner* — Hieu T Vo (57) ABSTRACT

In some embodiments of the present disclosure, an electric motor is used to generate correction torques to counteract unwanted torque pulses generated by an internal combustion engine during a cylinder deactivation mode. In some embodiments, the electric motor may be mounted to an accessory drive such as a power take-off mechanism or a front end accessory drive (FEAD). In some embodiments, the correction torques may be determined using an engine model. The correction torques help to reduce or eliminate noise, vibration, and/or harshness (NVH) during the cylinder deactivation mode.

19 Claims, 5 Drawing Sheets

(56) References Cited

U.S. PATENT DOCUMENTS

| | | |
|---|---|---|
| 6,463,900 B1 | 10/2002 | Wakabayashi |
| 6,487,998 B1 | 12/2002 | Masberg et al. |
| 6,616,569 B2 | 9/2003 | Hoang et al. |
| 6,629,515 B1 | 10/2003 | Yamamoto et al. |
| 6,763,903 B2 | 7/2004 | Morimoto et al. |
| 7,657,350 B2 | 2/2010 | Moran |
| 7,663,505 B2 | 2/2010 | Publicover |
| 8,296,030 B2 | 10/2012 | Luo |
| 8,386,148 B2 | 2/2013 | Hyde |
| 8,419,592 B2 | 4/2013 | Fujiwara |
| 8,457,822 B2 * | 6/2013 | Ketfi-Cherif ............ B60K 6/48 701/22 |
| 8,532,843 B2 | 9/2013 | Nagura et al. |
| 8,594,912 B2 | 11/2013 | Weaver |
| 8,972,145 B2 | 3/2015 | Mahler et al. |
| 9,228,554 B2 | 1/2016 | Balzer |
| 9,266,523 B2 | 2/2016 | Ideshio et al. |
| 9,293,043 B2 | 3/2016 | Yamada |
| 9,349,289 B1 | 5/2016 | Taylor |
| 9,409,567 B2 | 8/2016 | Otake |
| 9,447,741 B2 | 9/2016 | Yang |
| 9,587,559 B2 * | 3/2017 | Hemphill ................. B60K 6/38 |
| 9,664,136 B2 | 5/2017 | Boesch |
| 9,926,881 B2 | 3/2018 | Sangameswaran |
| 9,957,941 B1 | 5/2018 | Gerty et al. |
| 10,081,361 B2 | 9/2018 | Books |
| 10,190,511 B2 | 1/2019 | Abdul-Rasool |
| 10,190,560 B2 | 1/2019 | Tedesco |
| 10,451,022 B2 | 10/2019 | Gerty |
| 10,487,762 B2 | 11/2019 | Vadlamani |
| 2009/0118914 A1 | 5/2009 | Schwenke |
| 2010/0019446 A1 | 1/2010 | Matsumoto et al. |
| 2010/0125402 A1 | 5/2010 | Bansal |
| 2011/0136620 A1 | 6/2011 | Gibson et al. |
| 2011/0153119 A1 | 6/2011 | Lee et al. |
| 2012/0029730 A1 | 2/2012 | Nagura et al. |
| 2012/0100960 A1 | 4/2012 | Pedlar et al. |
| 2012/0226433 A1 | 9/2012 | Hasan et al. |
| 2013/0158838 A1 | 6/2013 | Yorke et al. |
| 2013/0297124 A1 | 11/2013 | Be |
| 2014/0046577 A1 | 2/2014 | Wang et al. |
| 2014/0107878 A1 | 4/2014 | Takahashi et al. |
| 2014/0207348 A1 | 7/2014 | Wakayama et al. |
| 2014/0209059 A1 | 7/2014 | Kojima et al. |
| 2014/0336908 A1 | 11/2014 | Mori et al. |
| 2015/0158491 A1 | 6/2015 | Suzuki et al. |
| 2015/0166065 A1 | 6/2015 | Kuroki et al. |
| 2015/0175149 A1 | 6/2015 | Zhao et al. |
| 2015/0210261 A1 | 7/2015 | Mitsuyasu |
| 2015/0232099 A1 | 8/2015 | Miller et al. |
| 2015/0259008 A1 | 9/2015 | Seguchi |
| 2015/0275787 A1 | 10/2015 | Dufford et al. |
| 2015/0275840 A1 | 10/2015 | Sawada |
| 2015/0369199 A1 | 12/2015 | Nakamura |
| 2016/0019792 A1 | 1/2016 | Kawamata et al. |
| 2016/0040745 A1 | 2/2016 | Goossens |
| 2016/0107648 A1 | 4/2016 | Carlson |
| 2016/0230821 A1 | 8/2016 | Morino et al. |
| 2017/0067433 A1 | 3/2017 | Ahn |
| 2017/0080919 A1 | 3/2017 | Follen et al. |
| 2017/0174218 A1 | 6/2017 | Hansen et al. |
| 2017/0240162 A1 | 8/2017 | Higashitani et al. |
| 2017/0247025 A1 | 8/2017 | Velazquez Alcantar |
| 2017/0282921 A1 | 10/2017 | Limbacher |
| 2017/0306893 A1 * | 10/2017 | Leone .................... B60K 6/365 |
| 2017/0330456 A1 | 11/2017 | Miller |
| 2017/0349179 A1 | 12/2017 | Cunningham et al. |
| 2017/0350360 A1 | 12/2017 | Tedesco et al. |
| 2018/0057001 A1 | 3/2018 | Hu et al. |
| 2018/0080425 A1 | 3/2018 | Ose et al. |
| 2018/0119662 A1 | 5/2018 | Gerty |
| 2018/0120841 A1 | 5/2018 | Endo et al. |
| 2018/0202379 A1 | 7/2018 | Nagashima et al. |
| 2018/0202408 A1 | 7/2018 | Majima |
| 2018/0215386 A1 | 8/2018 | Naserian et al. |
| 2018/0223788 A1 | 8/2018 | Gerty |
| 2018/0230919 A1 | 8/2018 | Nagashima et al. |
| 2018/0244273 A1 | 8/2018 | Iwamoto et al. |
| 2018/0265090 A1 | 9/2018 | Sharma et al. |
| 2018/0273047 A1 | 9/2018 | Wang |
| 2018/0320615 A1 | 11/2018 | Pirjaberi et al. |
| 2018/0362020 A1 * | 12/2018 | Kobler .................... B60K 6/30 |
| 2019/0031171 A1 | 1/2019 | Iwamoto et al. |
| 2019/0082149 A1 | 3/2019 | Correnti |
| 2019/0093581 A1 | 3/2019 | Vadlamani |
| 2019/0093619 A1 | 3/2019 | Vadlamani |
| 2019/0100207 A1 | 4/2019 | Maruyama et al. |
| 2019/0346011 A1 | 11/2019 | Gerty |
| 2020/0116116 A1 | 4/2020 | Gerty |
| 2020/0123995 A1 | 4/2020 | Vadlamani |

FOREIGN PATENT DOCUMENTS

| | | |
|---|---|---|
| EP | 1 052 401 A2 | 11/2000 |
| EP | 2410158 A1 | 1/2012 |
| EP | 2420663 A1 | 2/2012 |
| EP | 2 500 197 A2 | 9/2012 |
| EP | 2 578 871 A1 | 4/2013 |
| EP | 2 696 053 A1 | 2/2014 |
| EP | 2781722 | 9/2014 |
| EP | 2 500 197 B1 | 2/2018 |
| GB | 2484803 | 4/2012 |
| GB | 2519158 A | 4/2015 |
| JP | 2010-242621 A | 10/2010 |
| RU | 2 540 679 C1 | 2/2015 |
| WO | 2012/063389 A1 | 5/2012 |
| WO | 2014/064524 | 5/2014 |
| WO | 2016/014396 A1 | 1/2016 |

OTHER PUBLICATIONS

International Search Report and Written Opinion dated Jan. 24, 2019, issued in International Application No. PCT/US2018/052726, filed Sep. 25, 2018, 9 pages.

Office Action dated Nov. 1, 2018, from related U.S. Appl. No. 15/716,315, filed Sep. 26, 2017, 30 pages.

"Eco-Approach and Departure at Signalized Intersections: Preliminary Modeling Results," Fall/Winter Webinar Series, Nov. 20, 2013, U.S. Department of Transportation, 42 pages.

"Investigating the Potential Benefits of Broadcasted Signal Phase and Timing (SPaT) Data Under IntelliDrive(SM)," Final Report, May 20, 2011, California PATH Program, Institute of Transportation Studies, University of California, Berkeley, 98 pages.

Govindswamy, K., et al., "Aspects of NVH Integration in Hybrid Vehicles," SAE International Journal of Passenger Cars—Mechanical Systems 2(1):1396-1405, 2009.

Ito, Y., et al., "Vibration-Reducing Motor Control for Hybrid Vehicles," R&D Review of Toyota CRDL 40(2):37-43, 2005.

Notice of Allowance dated Jun. 13, 2019, issued in U.S. Appl. No. 15/945,070, filed Apr. 4, 2018, 8 pages.

Notice of Allowance dated Jul. 17, 2019, issued in U.S. Appl. No. 15/716,315, filed Sep. 26, 2017, 6 pages.

International Search Report and Written Opinion dated Aug. 22, 2019, issued in corresponding International Application No. PCT/US2019/031543, filed May 9, 2019, 9 pages.

International Search Report and Written Opinion dated Aug. 22, 2019, issued in corresponding International Application No. PCT/US2019/031554, filed May 9, 2019, 7 pages.

Gerty, M.D., et al., "Intermittent Restart for Automatic Engine Stop Start System," U.S. Appl. No. 15/341,320, filed Nov. 2, 2016, 21 pgs.

U.S. Appl. No. 15/341,320, Notice of Allowance dated Dec. 6, 2017, 5 pages.

U.S. Appl. No. 15/716,315, Supplemental Notice of Allowance dated Sep. 17, 2019, 2 pages.

U.S. Appl. No. 15/975,586, Office Action dated Oct. 17, 2019, 11 pages.

U.S. Appl. No. 15/975,649, Office Action dated Oct. 31, 2019, 9 pgs.

(56) References Cited

OTHER PUBLICATIONS

U.S. Appl. No. 15/975,649, Notice of Allowance dated Feb. 13, 2020, 5 pgs.
U.S. Appl. No. 15/975,586, Notice of Allowance dated Apr. 15, 2020, 7 pgs.
U.S. Appl. No. 15/975,649, Notice of Allowance dated Apr. 16, 2020, 2 pgs.
European Supplementary Search Report in Application 18860403.7, dated Sep. 29, 2020, 10 pages.
U.S. Appl. No. 16/658,667, Notice of Allowance dated Sep. 17, 2020, 9 pages.

* cited by examiner

SYSTEMS AND METHODS FOR REDUCING NOISE, VIBRATION AND/OR HARSHNESS ASSOCIATED WITH CYLINDER DEACTIVATION IN INTERNAL COMBUSTION ENGINES

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a vehicle comprising an internal combustion engine, an electric motor, an accessory drive, and an electronic control unit (ECU) is provided. The accessory drive has a drive shaft and an output shaft. The drive shaft of the accessory drive is coupled to an output of the internal combustion engine, and the output shaft of the accessory drive is coupled to the electric motor. The ECU is configured to initiate a cylinder deactivation mode for the internal combustion engine; and cause the electric motor to generate torque to counteract vibration induced by the internal combustion engine during the cylinder deactivation mode.

In some embodiments, a method of reducing vibration generated by an internal combustion engine during a cylinder deactivation mode is provided. An engine control unit (ECU) transmits a command to initiate a cylinder deactivation mode. The ECU monitors engine state values of the engine. The ECU determines a correction torque to compensate for torque pulses generated by the engine during the cylinder deactivation mode. The ECU causes an electric motor to apply the correction torque.

In some embodiments, a non-transitory computer-readable medium is provided. The computer-readable medium has computer-executable instructions stored thereon that, in response to execution by an electronic control unit (ECU), cause the ECU to perform actions for reducing vibration generated by an internal combustion engine during a cylinder deactivation mode, the actions comprising transmitting, by the ECU, a command to initiate a cylinder deactivation mode; monitoring, by the ECU, engine state values of the engine; determining, by the ECU, an expected average torque based on a fuel demand; determining, by the ECU, a correction torque to compensate for a difference between the expected average torque and an instantaneous torque; and causing, by the ECU, an electric motor to apply the correction torque.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Numerous techniques for reducing fuel consumption within vehicles such as Class 8 trucks have been developed. For example, systems have been created wherein one or more cylinders of an internal combustion engine are deactivated when full power is not required. In some embodiments, the fuel supply for one or more cylinders may be cut off so that those cylinders no longer generate power or waste fuel. In some embodiments, the valves for one or more cylinders may be kept shut, thus deactivating the cylinders. Cylinder deactivation may typically be used in internal combustion engines that are inefficient at low power levels due to their relatively large displacement.

While cylinder deactivation can provide a reduction in fuel consumption, implementations of the technology tend to have various drawbacks. For example, when operating in a cylinder deactivation mode, an internal combustion engine is likely to generate increased noise, vibration, and harshness (NVH). This may be due to the fact that the firing cylinders are no longer evenly distributed throughout each rotation of the crankshaft, and so the torque generated by the engine includes pulses that contribute to increased NVH. This increased NVH may be so severe that it makes the cylinder deactivation mode unsuitable for regular use.

Figure 1:
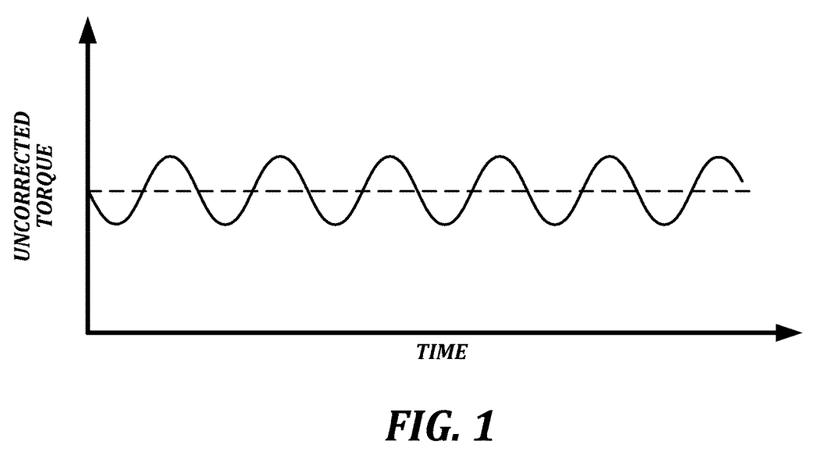
FIG. 1 is a chart that illustrates an example of the behavior of an internal combustion engine while in a cylinder deactivation mode, to show a problem within the prior art.

FIG. 1 is a chart that illustrates an example of the behavior of an internal combustion engine while in a cylinder deactivation mode, to show this problem within the prior art. The horizontal axis of the chart shows the passage of time, and the vertical axis of the chart shows a torque generated by the internal combustion engine. While torque is generally denoted in pounds-feet (lbs-ft), the chart in FIG. 1 is not necessarily to scale. The time depicted by the chart may show one or more revolutions of the engine, such that the solid curve in the chart shows torque pulses that are generated during a revolution of the engine while in the cylinder deactivation mode. The dashed line in the chart shows an average torque generated by the engine while in the cylinder deactivation mode. In some instances, the torque pulses may not be generated as regularly as depicted in the chart, but instead may be irregular within a single revolution of the engine.

One of ordinary skill in the art will recognize that the torque pulses illustrated in FIG. 1 cause unwanted NVH during the cylinder deactivation mode. What is desired are techniques that can reduce the increased NVH that is generated by the torque pulses during the cylinder deactivation mode.

Although exemplary embodiments of the present disclosure will be described hereinafter with reference to Class 8 trucks, it will be appreciated that aspects of the present disclosure have wide application, and therefore, may be suitable for use with many types of vehicles having internal combustion engines, such as passenger vehicles, buses, commercial vehicles, light and medium duty vehicles, etc. Accordingly, the following descriptions and illustrations herein should be considered illustrative in nature, and thus, not limiting the scope of the claimed subject matter.

Prior to discussing the details of various aspects of the present disclosure, it should be understood that several sections of the following description are presented largely in terms of logic and operations that may be performed by electronic components. These electronic components, which may be grouped in a single location or distributed through a vehicle, generally include processors, memory, storage devices, display devices, input devices, etc. It will be appreciated by one skilled in the art that the logic described herein may be implemented in a variety of hardware, software, and combination hardware/software configurations, including but not limited to, analog circuitry, digital circuitry, processing units, and the like. In circumstances where the components are distributed, the components are accessible to each other via communication links.

In the following description, numerous specific details are set forth in order to provide a thorough understanding of example embodiments of the present disclosure. It will be apparent to one skilled in the art, however, that many embodiments of the present disclosure may be practiced without some or all of the specific details. In some instances, well known process steps have not been described in detail in order not to obscure unnecessarily various aspects of the present disclosure. Furthermore, it will be appreciated the embodiments of the present disclosure may employ any of the features described herein.

Figure 2:
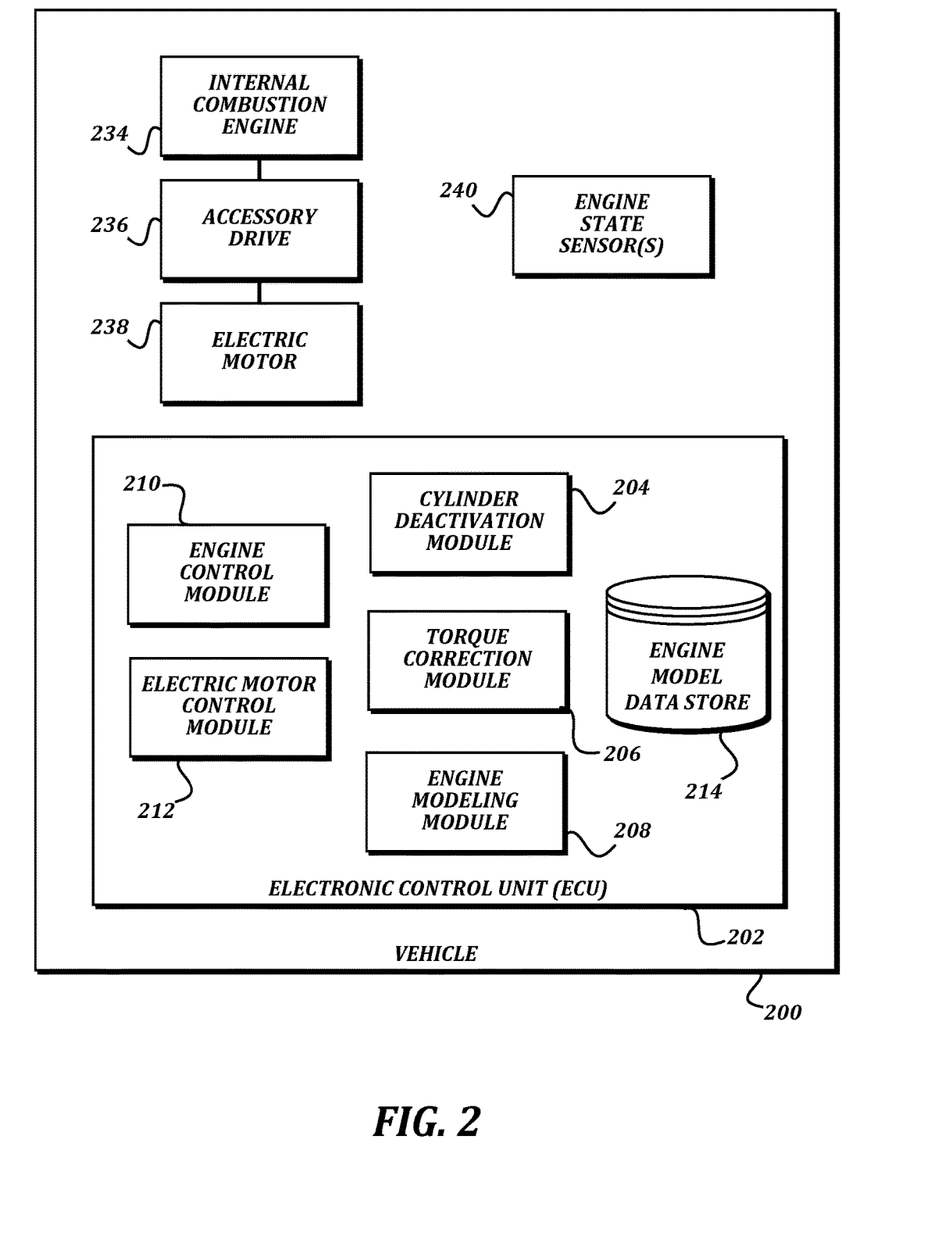
FIG. 2 is a block diagram that illustrates an example embodiment of a vehicle according to various aspects of the present disclosure.

FIG. 2 is a block diagram that illustrates an example embodiment of a vehicle according to various aspects of the present disclosure. In some embodiments, the vehicle 200 is a Class 8 truck, though in some embodiments other types of vehicles could be used. As illustrated, the vehicle 200 includes an internal combustion engine 234, an accessory drive 236, and an electric motor 238. The internal combustion engine 234 is the main power source for the vehicle 200, and is coupled to the powertrain (not illustrated).

The accessory drive 236 is coupled to an output of the internal combustion engine 234 in any suitable manner, including but not limited to being coupled via a gearbox to a crankshaft of the internal combustion engine 234, and being coupled to an accessory drive connector of a transmission that is in turn connected to the internal combustion engine 234. Two non-limiting types of accessory drives 236 are power take off (PTO) devices and front end accessory drive (FEAD) devices. In embodiments of the present disclosure, the accessory drive 236 is capable of bidirectionally transferring power to and from the internal combustion engine 234. In other words, the accessory drive 236 may receive power from the internal combustion engine 234 in order to power a downstream device, or may provide power to the internal combustion engine 234 from a downstream device in order to turn the internal combustion engine 234.

The electric motor 238 is coupled to the accessory drive 236 and to a battery (not illustrated). The electric motor 238 is configured to, at appropriate times, provide power through the accessory drive 236 to the internal combustion engine 234. In some embodiments, this power can be used to start (or restart) the internal combustion engine 234, and/or to provide torque correction as described below. The electric motor 238 may also be able to, at appropriate times, receive power from the accessory drive 236 to charge the battery. In some embodiments, the electric motor 238 is of an appropriate size and rating to be able to turn the internal combustion engine 234 to a speed in a range of about 600-700 RPM. In some embodiments, the electric motor 238 and the battery to which it is coupled may operate on a 24V or 48V electrical system in order to increase the amount of available power. In some embodiments, the electric motor 238 may be capable of replacing a traditional starter motor for the vehicle 200, which may or may not be present. Further implementation details and use of each of these components 234, 236, 238 are, in general, known to one of ordinary skill in the art, and so are not described in further detail herein. While an electric motor 238 that is integrated into the drivetrain of the vehicle 200 or otherwise more closely integrated with the engine 234 may be used, certain technical benefits may be obtained by using an electric motor 238 that can be connected through the accessory drive 236. As a nonlimiting example of a technical benefit, connecting the electric motor 238 through the accessory drive 236 allows a vehicle 200 to have the electric motor 238 and the functionality described herein installed as an after-market product, thus not requiring the vehicle 200 to be designed to use the electric motor 238 in order to obtain the benefits of the present disclosure.

As illustrated, the vehicle 200 also includes one or more engine state sensors 240 and an electronic control unit (ECU) 202. The vehicle 200 also includes other elements that are known to one of ordinary skill in the art, including but not limited to a transmission and a communication bus such as a CAN bus that allows communication between components of the vehicle 200. Because these elements are well known, they are not illustrated or described further herein for the sake of brevity.

In some embodiments, the engine state sensors 240 provide information about the physical state of the internal combustion engine 234. In some embodiments, values produced by the engine state sensors 240 may be provided to other components of the vehicle 200 by an engine electronic control unit (ECU). Some typical examples of engine state sensors 240 include, but are not limited to, an engine speed sensor, an engine position sensor, an engine fuel sensor, an intake pressure sensor, an injection timing sensor, and an exhaust gas recirculation (EGR) flow rate sensor. In some embodiments, the engine state sensors 240 may be capable of generating instantaneous engine state values at a high rate in order to provide high precision control of engine functionality such as ignition timing. For example, in some embodiments, the engine state sensors 240 may include sensors capable of generating instantaneous engine state values at rates between about 50 values per second to 100,000 values per second.

In some embodiments, the electronic control unit (ECU) 202 is an ECU computing device that is configured to receive signals from devices such as the engine state sensors 240, to determine correction torques based on the received signals, and to transmit signals to the electric motor 238 to cause the electric motor 238 to generate the correction torques. As illustrated, the ECU 202 includes a cylinder deactivation module 204, a torque correction module 206, an engine modeling module 208, an engine control module 210, an electric motor control module 212, and an engine model data store 214.

In some embodiments, the cylinder deactivation module 204 is configured to detect a state in which entering a cylinder deactivation mode would be appropriate, and to instruct the engine control module 210 to deactivate one or more cylinders. The cylinder deactivation module 204 may also be configured to detect when the state in which cylinder deactivation mode is appropriate ends, and to instruct the engine control module 210 to reactivate the deactivated cylinders. In some embodiments, the state in which entering a cylinder deactivation mode is appropriate is a low power state, such as a torque demand or a fuel demand falling below a low power threshold. In some embodiments, the state in which entering a cylinder deactivation mode is appropriate may also be based on additional factors, including but not limited to whether an aftertreatment system is in a regeneration mode.

In some embodiments, the engine control module 210 is an electronic controller configured to manage operation of the engine 234. For example, the engine control module 210 may receive a torque request from another component of the vehicle 200, such as an accelerator pedal, and may control a fuel/air mixture, a valve timing, a fuel rate, and/or other settings of the engine 234 in order to cause the engine 234 to generate the requested amount of torque. The engine control module 210 may also receive requests from the cylinder deactivation module 204 to deactivate or reactivate cylinders, and may send commands to components of the engine 234 to cause such deactivation or reactivation.

In some embodiments, the electric motor control module 212 is configured to manage operation of the electric motor 238, in that the electric motor control module 212 may receive a torque request from another component of the vehicle 200, and may cause the electric motor 238 to generate the requested amount of torque. In some embodiments, the electric motor control module 212 may also be capable of causing the electric motor 238 to generate a negative torque or otherwise absorb excess torque from the engine 234. In other words, the electric motor 238 may be instructed to receive torque from the internal combustion engine 234 through the accessory drive 236 in order to operate as a generator to store power in the batteries.

In some embodiments, the torque correction module 206 is configured to, along with the engine modeling module 208, determine when correction torques should be generated in order to reduce noise, vibration, and harshness (NVH) while the engine 234 is in a cylinder deactivation mode, and what those correction torques should be. Further description of the actions taken by the torque correction module 206 and the engine modeling module 208, as well as the engine models stored in the engine model data store 214, is provided below.

In general, the word "module," as used herein, refers to logic embodied in hardware or software instructions, which can be written in a programming language, such as C, C++, C#, COBOL, JAVA™, PHP, Perl, HTML, CSS, JavaScript, VBScript, ASPX, Microsoft .NET™, and/or the like. A module may be compiled into executable programs or written in interpreted programming languages. Modules may be callable from other modules or from themselves. Generally, the modules described herein refer to logical components that can be merged with other modules, or can be divided into sub-modules. The modules can be stored in any type of computer-readable medium or computer storage device and be stored on and executed by one or more general purpose computers, thus creating a special purpose computer configured to provide the module.

As understood by one of ordinary skill in the art, a "data store" as described herein may be any suitable device configured to store data for access by a module or another computing device. One example of a data store is a relational database management system (RDBMS). However, any other suitable storage technique and/or device capable of organizing and storing the data may be used, such as a key-value store, an object database, a look-up table, and/or the like. Examples of a data store may also include data stored in an organized manner on a computer-readable storage medium, as described further below.

One example of a data store which includes reliable storage, but also low overhead, is a file system or database management system that stores data in files (or records) on a computer-readable medium such as flash memory, random access memory (RAM), hard disk drives, EPROMs, ROMs, and/or the like. Such a data store may be likely to be used locally by the vehicle 200. One of ordinary skill in the art will recognize that a single data store described herein may be separated into multiple data stores without departing from the scope of the present disclosure.

Though the ECU 202 is illustrated as a single unit, in some embodiments, the modules illustrated within the ECU 202 may be split amongst separate computing devices. For example, a first ECU may provide the engine control module 210, a second ECU may provide the electric motor control module 212, and a third ECU may provide the start-stop controller module 204, the torque correction module 206, and the feedback control module 208. Any other combinations of modules and ECUs may also be used without departing from the scope of the present disclosure.

The various components illustrated in FIG. 2 may communicate with each other through a vehicle-wide communications network (not shown). Those skilled in the art and others will recognize that the vehicle-wide communications network may be implemented using any number of different communication protocols such as, but not limited to, Society of Automotive Engineers' ("SAE") J1587, SAE J1922, SAE J1939, SAE J1708, and combinations thereof.

Figure 3A:
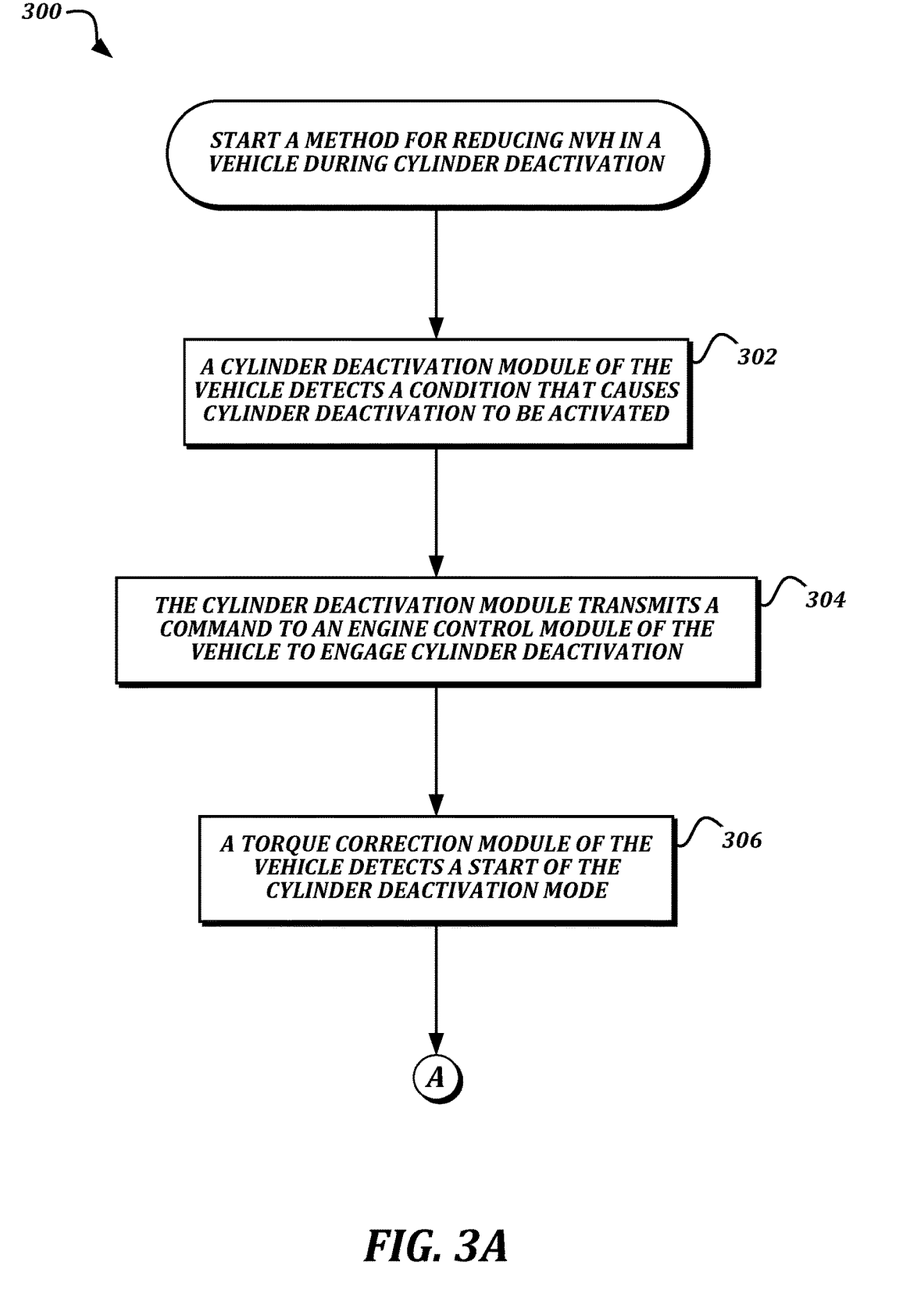
FIGS. 3A-3B are a flowchart that illustrates an example embodiment of a method for reducing NVH in a vehicle during cylinder deactivation according to various aspects of the present disclosure.
Figure 3B:
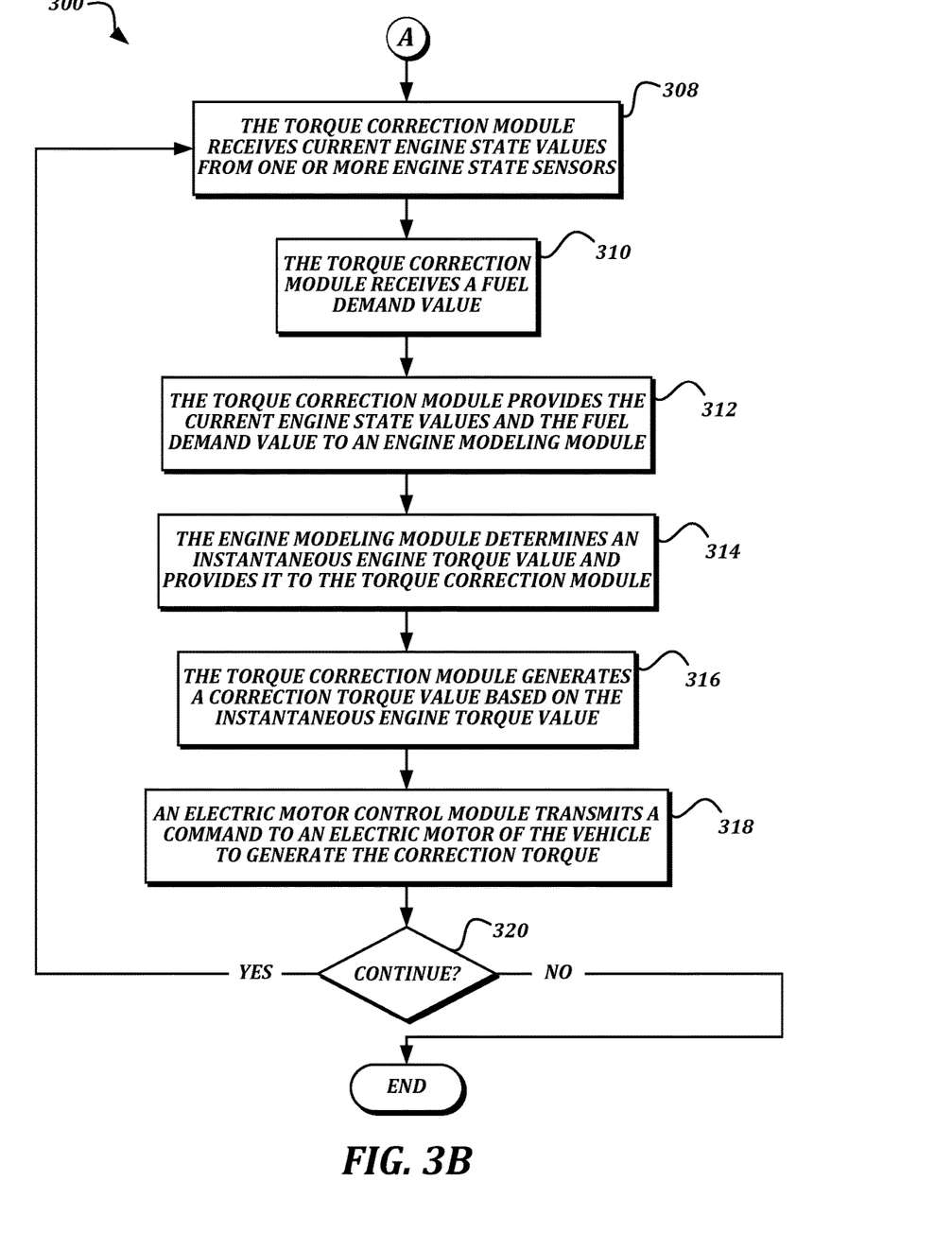

FIGS. 3A-3B are a flowchart that illustrates an example embodiment of a method for reducing NVH in a vehicle during cylinder deactivation according to various aspects of the present disclosure. From a start block, the method 300 proceeds to block 302, where a cylinder deactivation module 204 of the vehicle 200 detects a condition that causes cylinder deactivation to be activated. As discussed above, the condition may include a detected low power state, such as detecting that a fuel demand, a torque demand, or an engine speed has dropped below a predetermined low power threshold. At block 304, the cylinder deactivation module 204 transmits a command to an engine control module 210 of the vehicle 200 to engage cylinder deactivation. The engine control module 210, in turn, transmits commands to components of the engine 234 to cause the cylinder or cylinders to be deactivated. In some embodiments, the command from the cylinder deactivation module 204 may indicate how many cylinders or which cylinders to deactivate. In some embodiments, the engine control module 210 may determine appropriate cylinders to deactivate.

Next, at block 306, a torque correction module 206 of the vehicle 200 detects a start of the cylinder deactivation mode. In some embodiments, the torque correction module 206 may detect the command transmitted from the cylinder deactivation module 204 to the engine control module 210. In some embodiments, the cylinder deactivation module 204 may transmit a notification to the torque correction module 206 indicating that the cylinder deactivation mode has been entered. In some embodiments, the torque correction module 206 may detect that the cylinder deactivation mode has been entered based on engine performance indicated by values received from the engine state sensors 240. In some embodiments, the torque correction module 206 detects the start of the cylinder deactivation mode at the beginning of the process for entering the cylinder deactivation mode, and does not wait for the entry into the cylinder deactivation mode to be complete before its start is detected.

The method 300 then proceeds to a continuation terminal ("terminal A"). From terminal A (FIG. 3B), the method 300 proceeds to block 308, where the torque correction module 206 receives current engine state values from one or more engine state sensors 240. The current engine state values are, in combination with the fuel demand value obtained in block 310, sufficient to use the engine model in order to determine an instantaneous amount of torque being generated by the engine 234. The current engine state values may include, but are not limited to, an engine speed value from an engine speed sensor, an engine position value from an engine position sensor, an engine fuel value from an engine fuel sensor, an intake pressure value from an intake pressure sensor, an injection timing value read from the engine control module 210 by an injection timing sensor, and an EGR flow rate value from an EGR flow rate sensor. The current engine state values may also include an indication of which cylinders have been deactivated. At block 310, the torque correction module 206 receives a fuel demand value. In some embodiments, the fuel demand value may be based on an accelerator pedal position, fuel demands provided by other accessory systems, or any other source. In some embodiments, a torque demand may be used instead of a fuel demand.

Next, at block 312, the torque correction module 206 provides the current engine state values and the fuel demand value to an engine modeling module 208. At block 314, the engine modeling module 208 determines an instantaneous engine torque value and provides it to the torque correction module 206. In some embodiments, the engine modeling module 208 retrieves an engine model from the engine model data store 214, and uses the engine model to determine the instantaneous engine torque value based on the current engine state values and the fuel demand value. For example, the engine model may include a look-up table that includes instantaneous torque values for various combinations of engine position, fuel demand, engine speed, deactivated cylinders, engine fuel rate, intake pressure, injection timing, EGR flow rate, and so on. The engine modeling module 208 may then retrieve the instantaneous torque values from the look-up table based on these values. The instantaneous engine torque value will vary throughout each revolution of the engine 234, depending on whether the deactivated cylinders would normally be in an power portion of their cycle at the given position of the engine. This variation in the instantaneous engine torque value is one factor that contributes to increased NVH.

At block 316, the torque correction module 206 generates a correction torque value based on the instantaneous engine torque value. In some embodiments, the torque correction module 206 may use a look-up table to determine an expected torque value that would be generated given the fuel demand value in the absence of cylinder deactivation, or an average torque value that would be generated given the fuel demand value with cylinder deactivation engaged. In some embodiments, the torque correction module 206 may request an expected torque value from the engine modeling module 208, which may use the engine model to determine the expected torque value given the engine state values. The resulting correction torque value may be determined based on an inverse of a difference between the expected torque value and the instantaneous engine torque value. For example, if the expected torque value is 1460 lb-ft., and the instantaneous engine torque value is 1458 lb-ft., the resulting correction torque value would be 2 lb-ft. As another example, if the expected torque value is 1460 lb-ft., and the instantaneous engine torque value is 1467 lb-ft., the resulting correction torque value would be −7 lb-ft.

In embodiments wherein the expected torque value is an average torque generated by the engine 234 during cylinder deactivation, the correction torque values may be both positive (for points in each engine revolution where torque is low due to the inactive cylinders) and negative (for points in each engine revolution where the inactive cylinders would not be contributing to engine torque). In embodiments wherein the expected torque value is the expected torque that would be generated by the engine 234 in the absence of cylinder deactivation, all of the correction torque values may be positive (to make up for the torque missing from the inactive cylinders in each revolution). While the latter embodiments will provide the benefit of not causing a reduction in apparent power of the engine 234 during cylinder deactivation, the former embodiments provide the benefit of charging the batteries that power the electric motor 238 during the negative torque portions of the cycle.

At block 318, an electric motor control module 212 of the vehicle 200 transmits a command to an electric motor of the vehicle to generate the correction torque. As shown in FIG. 2, the electric motor 238 transmits the correction torque through the accessory drive 236. In some embodiments, the correction torque may be calculated as an absolute torque to be applied, and the electric motor control module 212 may determine a voltage and/or gear ratio to use to apply the correction torque. In some embodiments, the voltage and/or gear ratio may themselves be the control variable, in which case the electric motor control module 212 may receive the values from the torque correction module 206 and use them directly to control the electric motor 238.

The method 300 then proceeds to decision block 320, where a determination is made regarding whether the cylinder deactivation mode is still active. In some embodiments, it may be determined that the cylinder deactivation mode is still active even if a command to exit cylinder deactivation mode has been transmitted or detected, so long as the engine 234 has not returned completely to normal operation. If the cylinder deactivation mode is still active, then the result of decision block 320 is YES, and the method 300 returns to block 308. Otherwise, if the cylinder deactivation mode is no longer active, then the result of decision block 320 is NO, and the method 300 proceeds to an end block to terminate.

One of ordinary skill in the art will recognize that the method 300 operates as control loop. In some embodiments, the loop implemented by the method 300 may operate at high speed in order to effectively counteract NVH, such as a speed between 50 loops per second and 100,000 loops per second. In some embodiments, any other loop frequency may be used that is effective for counteracting NVH within a particular vehicle 200.

Though embodiments were discussed above that use engine models to determine instantaneous engine torque, and to then determine a correction torque based on a difference between the instantaneous engine torque and an expected average torque, in some embodiments, other techniques may be used. For example, in some embodiments, the torque correction module 206 may use the engine modeling module 208 to determine an expected average engine speed instead of an expected average torque. The torque correction module 206 may then use a difference between the expected average engine speed and a current engine speed to determine the correction torque. In some embodiments, the torque correction module 206 may use a feedback control loop, such as a proportional-integral-derivative (PID) control loop, to determine the correction torque based on the current engine speed and the expected average engine speed.

In such embodiments, the expected average engine speed would be used as a setpoint, the current engine speed would be used as a process variable, and the correction torque would be used as the control variable. In some embodiments, the torque correction module 206 may be capable of using either the torque-based determination or the engine speed-based determination, and may switch back and forth between the two when appropriate. For example, the torque correction module 206 may use the torque-based determination when a transmission of the vehicle 200 is in gear and/or the vehicle 200 is moving, and may use the engine speed-based determination if the vehicle 200 is not moving and/or is operating at idle speed.

Figure 4A:
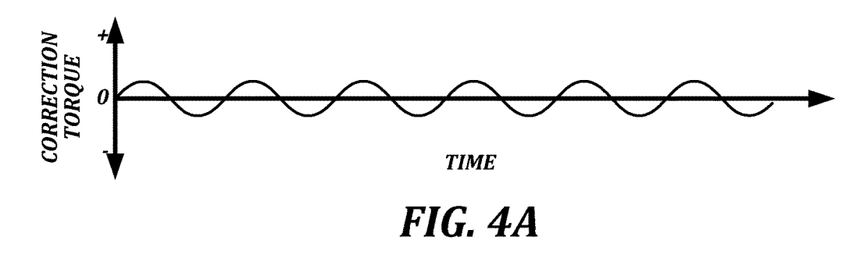
FIGS. 4A and 4B are charts that illustrate the relationship between correction torques generated by example embodiments of the present disclosure and the resulting torque within the vehicle in example embodiments of the present disclosure.
Figure 4B:
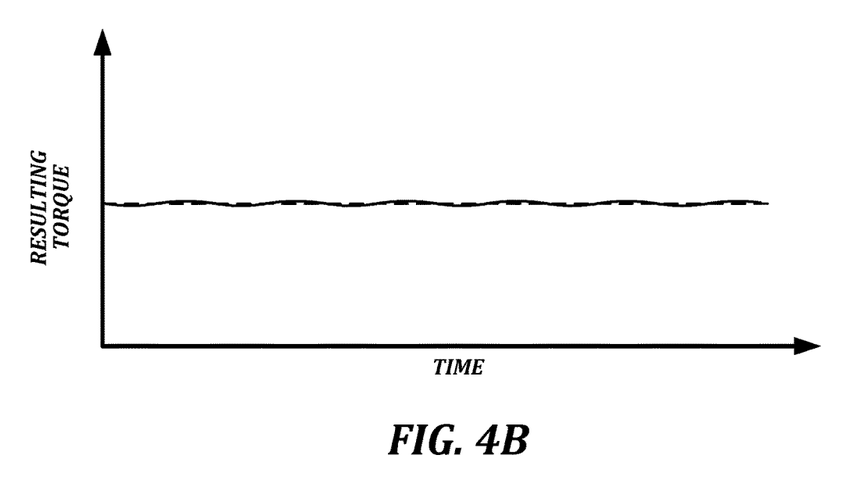

FIGS. 4A and 4B are charts that illustrate the relationship between correction torques generated by example embodiments of the present disclosure and the resulting torque within the vehicle 200 in example embodiments of the present disclosure. The chart in FIG. 4A includes a horizontal axis that shows the passage of time, and a vertical axis that shows an amount of correction torque generated by an example embodiment of the present disclosure. The solid curve in FIG. 4A shows the amount of correction torque being generated over time. As shown, the correction torque can either be positive (if the instantaneous engine torque is below the average torque) or negative (if the instantaneous engine torque is above the average torque).

The chart in FIG. 4B includes a horizontal axis that shows the passage of time, and a vertical axis that shows a resulting torque applied to the vehicle by the example embodiment of the present disclosure. The solid curve in FIG. 4B shows the resulting torque, which may vary from the average torque, but in a much smaller amount than the uncorrected torque illustrated in FIG. 1. In some embodiments, the resulting torque may not vary from the average torque. Though not necessarily to scale, FIGS. 4A and 4B are aligned with FIG. 1 to show that the correction torques may be generated in inverse phase to the torque pulses illustrated in FIG. 1 in order to substantially cancel out the torque pulses within the resulting torque.

While illustrative embodiments have been illustrated and described, it will be appreciated that various changes can be made therein without departing from the spirit and scope of the invention.

The embodiments of the invention in which an exclusive property or privilege is claimed are defined as follows:

1. A vehicle, comprising:
    an internal combustion engine;
    an electric motor;
    an accessory drive having a drive shaft and an output shaft, wherein the drive shaft of the accessory drive is coupled to an output of the internal combustion engine, and the output shaft of the accessory drive is coupled to the electric motor; and
    an electronic control unit (ECU) configured to:
        initiate a cylinder deactivation mode for the internal combustion engine;
        monitor engine state values of the engine;
        determine a correction torque to compensate for torque pulses generated by the engine during the cylinder deactivation mode; and
        cause the electric motor to generate the correction torque to counteract vibration induced by the internal combustion engine during the cylinder deactivation mode.

2. The vehicle of claim 1, further comprising:
    one or more engine state sensors configured to provide the engine state values to the ECU at a rate of at least 50 values per second or at least 60 values per revolution of the internal combustion engine.

3. The vehicle of claim 2, wherein the engine state values include at least one of an engine speed value, an engine position value, an engine fuel value, an intake pressure value, an injection timing value, and an exhaust gas recirculation (EGR) flow rate value.

4. The vehicle of claim 2, wherein causing the electric motor to generate the correction torque to counteract vibration induced by the internal combustion engine during the cylinder deactivation mode includes:
    processing the engine state values using an engine model to determine an instantaneous engine torque; and
    determining the correction torque based on a difference between the instantaneous engine torque and an expected average torque.

5. The vehicle of claim 4, wherein the expected average torque is adjusted according to a fuel demand received by the ECU.

6. The vehicle of claim 2, wherein causing the electric motor to generate the correction torque to counteract vibration induced by the internal combustion engine during the cylinder deactivation mode includes:
    processing the engine state values using an engine model to determine an expected average engine speed; and
    determining the correction torque based on a difference between a current engine speed and the expected average engine speed.

7. The vehicle of claim 2, wherein determining the correction torque based on the difference between the current engine speed and the expected average engine speed includes using a feedback control loop having the current engine speed as a process variable, the expected average engine speed as a setpoint, and the correction torque as a control variable.

8. A non-transitory computer-readable medium having computer-executable instructions stored thereon that, in response to execution by an electronic control unit (ECU), cause the ECU to perform actions for reducing vibration generated by an internal combustion engine during a cylinder deactivation mode, the actions comprising:
    transmitting, by the ECU, a command to initiate a cylinder deactivation mode;
    monitoring, by the ECU, engine state values of the engine;
    determining, by the ECU, an expected average torque based on a fuel demand;
    determining, by the ECU, a correction torque to compensate for a difference between the expected average torque and an instantaneous torque; and
    causing, by the ECU, an electric motor to apply the correction torque.

9. The computer-readable medium of claim 8, wherein monitoring the engine state values of the engine includes receiving engine speed values from an engine speed sensor at a rate of at least 50 values per second or at least 60 values per revolution of the engine; and
    wherein the correction torque is determined and applied for each received engine speed value.

10. The computer-readable medium of claim 9, wherein the engine state values include at least one of an engine speed value, an engine position value, an engine fuel value, an intake pressure value, an injection timing value, and an exhaust gas recirculation (EGR) flow rate value.

11. The computer-readable medium of claim 8, wherein determining a correction torque includes:

processing the engine state values using an engine model to determine an instantaneous engine torque; and determining a correction torque based on a difference between the instantaneous engine torque and the expected average torque.

12. The computer-readable medium of claim 11, further comprising changing, by the ECU, the expected average torque in response to a change in the fuel demand.

13. A method of reducing vibration generated by an internal combustion engine during a cylinder deactivation mode, the method comprising:

transmitting, by an electronic control unit (ECU), a command to initiate a cylinder deactivation mode;

monitoring, by the ECU, engine state values of the engine;

determining, by the ECU, a correction torque to compensate for torque pulses generated by the engine during the cylinder deactivation mode; and causing, by the ECU, an electric motor to apply the correction torque.

14. The method of claim 13, wherein monitoring the engine state values of the engine includes receiving engine speed values from an engine speed sensor at a rate of at least 50 values per second or at least 60 values per revolution of the engine; and wherein the correction torque is determined and applied for each received engine speed value.

15. The method of claim 13, wherein the engine state values include at least one of an engine speed value, an engine position value, an engine fuel value, an intake pressure value, an injection timing value, and an exhaust gas recirculation (EGR) flow rate value.

16. The method of claim 13, wherein determining a correction torque includes:

determining, by the ECU, an expected average torque based on a fuel demand;

processing the engine state values using an engine model to determine an instantaneous engine torque; and determining a correction torque based on a difference between the instantaneous engine torque and the expected average torque.

17. The method of claim 16, further comprising changing, by the ECU, the expected average torque in response to a change in the fuel demand.

18. The method of claim 13, wherein determining a correction torque includes:

processing the engine state values using an engine model to determine an expected average engine speed; and determining a correction torque based on a difference between a current engine speed and the expected average engine speed.

19. The method of claim 18, wherein determining the correction torque based on the difference between a current engine speed and the expected average engine speed includes using a feedback control loop having the current engine speed as a process variable, the expected average engine speed as a setpoint, and the correction torque as a control variable.

* * * * *